US008706552B1

(12) United States Patent
Benjamin et al.

(10) Patent No.: US 8,706,552 B1
(45) Date of Patent: Apr. 22, 2014

(54) TARGETED ADVERTISEMENTS TO SCHEDULED TRANSPORTATION USERS

(75) Inventors: Michael H. Benjamin, Dover, MA (US); Weiqiang Xu, Bedford, MA (US); Everette T. Jordan, Needham, MA (US)

(73) Assignee: Flightview Inc., Newton, MA (US)

( * ) Notice: Subject to any disclaimer, the term of this patent is extended or adjusted under 35 U.S.C. 154(b) by 594 days.

(21) Appl. No.: 12/416,661

(22) Filed: Apr. 1, 2009

Related U.S. Application Data

(60) Provisional application No. 61/041,570, filed on Apr. 1, 2008.

(51) Int. Cl.
*G06Q 30/00* (2012.01)
*G06Q 30/02* (2012.01)

(52) U.S. Cl.
CPC ........ *G60Q 30/0261* (2013.01); *G06Q 30/0269* (2013.01); *G06Q 30/0271* (2013.01); *G06Q 30/0272* (2013.01); *G06Q 30/0252* (2013.01); *G06Q 30/0251* (2013.01); *G06Q 30/0241* (2013.01)
USPC .................. 705/14.58; 705/14.66; 705/14.67; 705/14.68; 705/14.5; 705/14.49; 705/14.4

(58) Field of Classification Search
CPC ................................................ G06Q 30/0261
USPC .......................................................... 705/14
See application file for complete search history.

(56) References Cited

U.S. PATENT DOCUMENTS

| | | | | |
|---|---|---|---|---|
| 3,780,459 | A * | 12/1973 | Modglin | 40/476 |
| 4,774,670 | A | 9/1988 | Palmieri | 701/204 |
| 4,899,157 | A | 2/1990 | Sanford et al. | 342/40 |
| 5,051,910 | A | 9/1991 | Liden | 701/204 |
| 5,265,023 | A | 11/1993 | Sokkappa | 701/120 |
| 5,448,243 | A | 9/1995 | Bethke et al. | 342/59 |
| 6,049,754 | A | 4/2000 | Beaton et al. | 701/204 |

(Continued)

FOREIGN PATENT DOCUMENTS

| | | |
|---|---|---|
| GB | 2327517 | 1/1999 |
| WO | WO 01/46886 | 6/2001 |

OTHER PUBLICATIONS

Haeme, R. A., et al "Airline performance modeling to support schedule development: An application case study", *Proceedings of the 1988 Winter Simulation Conference*, M. Abrams P. Haigh, and J. Comfort (eds), pp. 800-806.

(Continued)

*Primary Examiner* — John G Weiss
*Assistant Examiner* — Scott C Anderson
(74) *Attorney, Agent, or Firm* — Sunstein Kann Murphy & Timbers LLP

(57) ABSTRACT

A method of targeting an advertisement to users of scheduled transportation operating at a transportation facility having a set of programmable signs at distinct locations in the facility includes in a first computer process determining a dynamic profile of users proximate to the location of a selected programmable sign of the set for a relevant time window. The method further includes in a second computer process selecting from an advertisement database an advertisement having a set of selection criteria that are compatible with the dynamic profile for the relevant time window and in a third computer process causing display of the advertisement on the selected programmable sign during at least a portion of the relevant time window.

23 Claims, 8 Drawing Sheets

Gate Displays Embodiment of Invention

(56) References Cited

U.S. PATENT DOCUMENTS

| | | | |
|---|---|---|---|
| 6,285,987 B1 * | 9/2001 | Roth et al. | 705/14.71 |
| 6,349,258 B1 * | 2/2002 | Bonhoure et al. | 701/528 |
| 6,393,359 B1 | 5/2002 | Flynn et al. | 701/120 |
| 6,408,278 B1 * | 6/2002 | Carney et al. | 705/14.73 |
| 6,580,998 B2 | 6/2003 | Flynn et al. | 701/120 |
| 7,065,443 B2 | 6/2006 | Flynn et al. | 701/120 |
| 7,088,264 B2 | 8/2006 | Riley | 340/963 |
| 7,120,537 B2 | 10/2006 | Flynn et al. | 701/120 |
| 7,171,369 B1 * | 1/2007 | Bertram et al. | 705/5 |
| 2006/0259234 A1 | 11/2006 | Flynn et al. | 701/202 |
| 2006/0271415 A1 * | 11/2006 | Simmons et al. | 705/5 |
| 2007/0005232 A1 | 1/2007 | Flynn et al. | 701/120 |
| 2007/0030175 A1 * | 2/2007 | Horstemeyer | 340/994 |
| 2009/0063274 A1 * | 3/2009 | Dublin et al. | 705/14 |
| 2009/0118998 A1 | 5/2009 | Chau et al. | 701/120 |
| 2009/0171701 A1 * | 7/2009 | Bertram et al. | 705/6 |
| 2009/0234738 A1 * | 9/2009 | Britton et al. | 705/14 |

OTHER PUBLICATIONS

Wieland, F. "Parallel Simulation for Aviation Applications", *Proceedings of the 1998 Winter Simulation Conference*, D. J. Medeiros, E.F. Watson, J.S. Carson and M.S. Manivannan, eds, pp. 1191-1198.

* cited by examiner

Gate Displays Embodiment of Invention

Block Diagram

Block Diagram with Sales Portal

Campaigns

| ACS: Spring 08 | ISE-Madrid | ACS: Fall 08 | New Campaign |

Welcome: Bill Smith
Agency: Jones & Jones
Client: Hitz Surgical, Inc.

<<Logout>>

Campaign Information: ACS: Spring 08    Notes: Advertisements for ACS Show featuring Self-sharpening scapel. Banner ads in departure etc.
Start Date: Feb 23 2008
End Date: Feb 26 2008
Budget: $5,000

[Update]

Content

| Description | File Name | Size | Condition Set |
|---|---|---|---|
| Pre Show Banner | Booth_1450.jpg | 860 x 100 | A,B |
| Pre Show Banner | Booth_1450-wide.jpg | 1024 x 120 | A,B |
| Pre Show Full Screen | See_us_screen.jpg | 1024 x 768 | A,B,C |
| Pre Show Banner | Next_Year_Banner.jpg | 860 x 100 | D |
| <<Add Additional Content>> | | | |

Conditions

| Set A | Set B | Set C | Set D | <New Set> |

☐ Departure Security
☐ Departure Halls
☑ Departure Gates
☐ Arrival Halls
☐ Baggage Claim
☐ Arrival Ground Trans.

Event: American Council on Surgery ▼
Flight Status: On-time, Delayed ▼
Dest. Airport: LAS - Las Vegas ▼
Dates: Feb 23, 24 ▼
Arrival Time: All Day ▼
Price: $117 / k-displays ▼
Rotation: Max 10 imp./hour ▼

Reporting
<New Report>

Sales Portal

FIG. 6

| Campaigns | ACS: Spring 08 | ISE-Madrid | ACS: Fall 08 | New Campaign | | | | | | | | <<Logout>> |
|---|---|---|---|---|---|---|---|---|---|---|---|---|

Welcome: Bill Smith
Agency: Jones & Jones
Client: Hitz Surgical, Inc.

Campaign Information: ACS: Spring 08  Notes: Advertisements for ACS Show featuring Self-sharpening
Start Date: Feb 23 2008                                scapel. Banner ads in departure etc.
End Date: Feb 26 2008
Budget: $5,000

Close Report

| Description | File Name | 23-Feb-2008 | | 24-Feb-2008 | | 25-Feb-2008 | | 26-Feb-2008 | | Total | |
|---|---|---|---|---|---|---|---|---|---|---|---|
| | | Displays | Cost | Displays | Cost | Displays | Cost | Displays | Cost | Displays | Cost |
| Pre Show Banner | Booth_1450.jpg | 2,625 | $307.13 | 2,621 | $306.66 | 2,622 | $306.77 | 2,678 | $313.33 | 10,546 | $1,233.88 |
| Pre Show Banner | Booth_1450-wide | 2,332 | $272.84 | 2,334 | $273.08 | 2,347 | $274.60 | 2,339 | $273.66 | 9,352 | $1,094.18 |
| Pre Show Full Screen | See_us_screen.j | 2,900 | $339.30 | 2,867 | $335.44 | 2,888 | $337.90 | 2,865 | $335.21 | 11,250 | $1,347.84 |
| Post Show Banner | Next_Year_Bann | 2,487 | $290.98 | 2,450 | $286.65 | 2,455 | $287.24 | 2,467 | $288.64 | 9,859 | $1,153.50 |
| Total | | 10,344 | $1,210.25 | 10,272 | $1,201.82 | 10,312 | $1,206.50 | 10,349 | $1,210.83 | 41,277 | $4,829.41 |

Sales Report

*FIG. 8*

TARGETED ADVERTISEMENTS TO SCHEDULED TRANSPORTATION USERS

CROSS REFERENCE TO RELATED APPLICATIONS

The present application claims priority from U.S. Provisional Patent Application Ser. No. 61/041,570, filed Apr. 1, 2008, which is hereby incorporated by reference herein in its entirety.

TECHNICAL FIELD

The present invention relates to targeted advertising, and more particularly to targeting of advertising to users of scheduled transportation.

BACKGROUND ART

Air travelers as a group have above average spending habits and are harder to reach via typical media advertising. They typically have higher disposable income than the average population and may use that income to buy more luxury goods, theater and sporting event tickets, hi-end autos and financial services. This is detailed in the *The Arbitron Airport Advertising Study, Exploring an Undiscovered Upscale Medium* (2004 Arbitron, Inc). In addition, air travelers are spending more time in airports due to security, and flight delays. Much of this additional time is spent in the secure portion of the airport—between the security checkpoint and the gate area. Using dynamic travel information it is possible to assign attributes to the population. For example, in the gate area prior to departure it is possible to make a good estimation of the individual's destination, their arrival time at the destination, and the weather at the destination. Based on dynamic flight information, it is possible to know if the flight scheduled to leave from the gate is delayed and by how much. This information can be used to effectively target advertisements to specific audiences. Such targeted ads are more effective for advertisers.

SUMMARY OF THE INVENTION

In a first embodiment of the invention there is provided a method of targeting an advertisement to users of scheduled transportation operating at a transportation facility. In this embodiment, the facility has a set of programmable signs, and each of the signs has a distinct location at the facility. The method of this embodiment includes, with respect to the location of a selected programmable sign of the set, in a first computer process determining a dynamic profile of users proximate to the location for a relevant time window. The method further includes in a second computer process selecting from an advertisement database an advertisement having a set of selection criteria that are compatible with the dynamic profile for the relevant time window. Finally, the method includes in a third computer process causing display of the advertisement on the selected programmable sign during at least a portion of the relevant time window.

Optionally, the method further includes in a fourth computer process causing display of information of consumer interest based on the dynamic profile, during the relevant time window, to draw attention to the programmable sign. In a further related embodiment, the method includes causing display of the information of consumer interest simultaneously with the advertisement. Alternatively or in addition, causing display of the advertisement and causing display of the information are coordinated to effectuate display in alternation of the advertisement and the information.

In a further related embodiment, the selection criteria include a set of conditions reflecting a specification supplied by an advertiser.

In another related embodiment, the dynamic profile of users proximate to the location is created using real-time dynamic flight data. The flight data may include flight delay status.

Alternatively or additionally in a related embodiment, the method further includes in a fourth computer process compiling an integrated database of real-time departure and arrival information for the scheduled transportation as well as scheduled departure and arrival information for the scheduled transportation; and in a fifth computer process using the integrated database to develop the dynamic profile. The method may further include a sixth computer process wherein statistics are stored relative to display of the advertisement including data from the dynamic profile applicable to the relevant time window. In a further related embodiment, the advertisement is associated with an advertiser, and the method further includes providing a report to the advertiser based on the stored statistics.

In another embodiment, the invention provides a method of handling a request from an advertiser for a targeted advertisement to be displayed on a set of programmable signs, at a set of transportation facilities, to users of scheduled transportation. The method of this embodiment includes in a first computer process receiving via an advertising sales portal, the portal accessible to the advertiser over a network, a specification by the advertiser of (1) an advertisement to be displayed; and (2) a set of conditions for display of the advertisement, the conditions relating, at least in part, to a location with respect to which scheduled transportation, accessible from one of the set of transportation facilities, is a point of departure or a destination. The method further includes in a second computer process causing display of the advertisement, on at least one member of the set of programmable signs, dynamically, in accordance with the specification, taking into account real-time departure and arrival information for the scheduled transportation as well as scheduled departure and arrival information for the scheduled transportation.

In a further related embodiment, the specification by the advertiser further includes a selection of members of the set of programmable signs on which the advertisement is to be displayed. Optionally, the set of conditions includes an event occurring at the location.

In another related embodiment, the method further includes in a third computer process developing a dynamic profile of users proximate to a location for each member of the set of programmable signs for a relevant time window based in part on real-time departure and arrival information for the scheduled transportation as well as scheduled departure and arrival information for the scheduled transportation; and in a fourth computer process using the dynamic profile in determining when to cause display of the advertisement.

In a further related embodiment the method further includes in a fifth computer process storing statistics relative to display of the advertisement including data derived from the dynamic profile. Optionally, the method further includes in a sixth computer process providing a report to the advertiser using the stored statistics.

In another related embodiment, the method further includes in a third computer process determining a price for displaying the advertisement according to an auction mechanism.

In another embodiment, the invention provides a computer program product for targeting an advertisement to users of scheduled transportation at a transportation facility. In this embodiment the facility has a set of programmable signs and each of the signs has a distinct location at the facility. The computer program product of this embodiment includes a computer usable medium having computer readable program code thereon. The computer readable program code of this embodiment includes program code for determining a dynamic profile of user proximate to the location for a relevant time window. The computer readable program code also includes program code for selecting from an advertisement database an advertisement having a set of selection criteria that are compatible with the dynamic profile for the relevant time window. The computer readable program code further includes program code for causing display of the advertisement on the selected programmable sign during at least a portion of the relevant time window.

In a related embodiment the computer program product includes program code for causing display of information of consumer interest based on the dynamic profile, during the relevant time window, to draw attention to the programmable sign.

In a further related embodiment the computer program product includes program code for causing display of the information of consumer interest simultaneously with the advertisement.

BRIEF DESCRIPTION OF THE DRAWINGS

The foregoing features of the invention will be more readily understood by reference to the following detailed description, taken with reference to the accompanying drawings, in which:

FIG. 6 is an example of a sales portal implementation of the present invention.

FIG. 8 shows an embodiment of a sales report that could be generated using the sales portal in accordance with an embodiment of the present invention.

DETAILED DESCRIPTION OF SPECIFIC EMBODIMENTS

Definitions. As used in this description and the accompanying claims, the following terms shall have the meanings indicated, unless the context otherwise requires: A "set" of items may include any non-zero number of items; in other words, a "set" of items may include a single item or it may include a plurality of items. A "dynamic profile of users proximate to a location" is a collection of data, pertinent to the location in a transportation facility, characterizing, in terms of points of departure and destination, (for a relevant time window and for the location) the likely composition of users of scheduled transportation who are passing through a region, in which is included the location and within which may be viewed a programmable sign.

Figure 1:
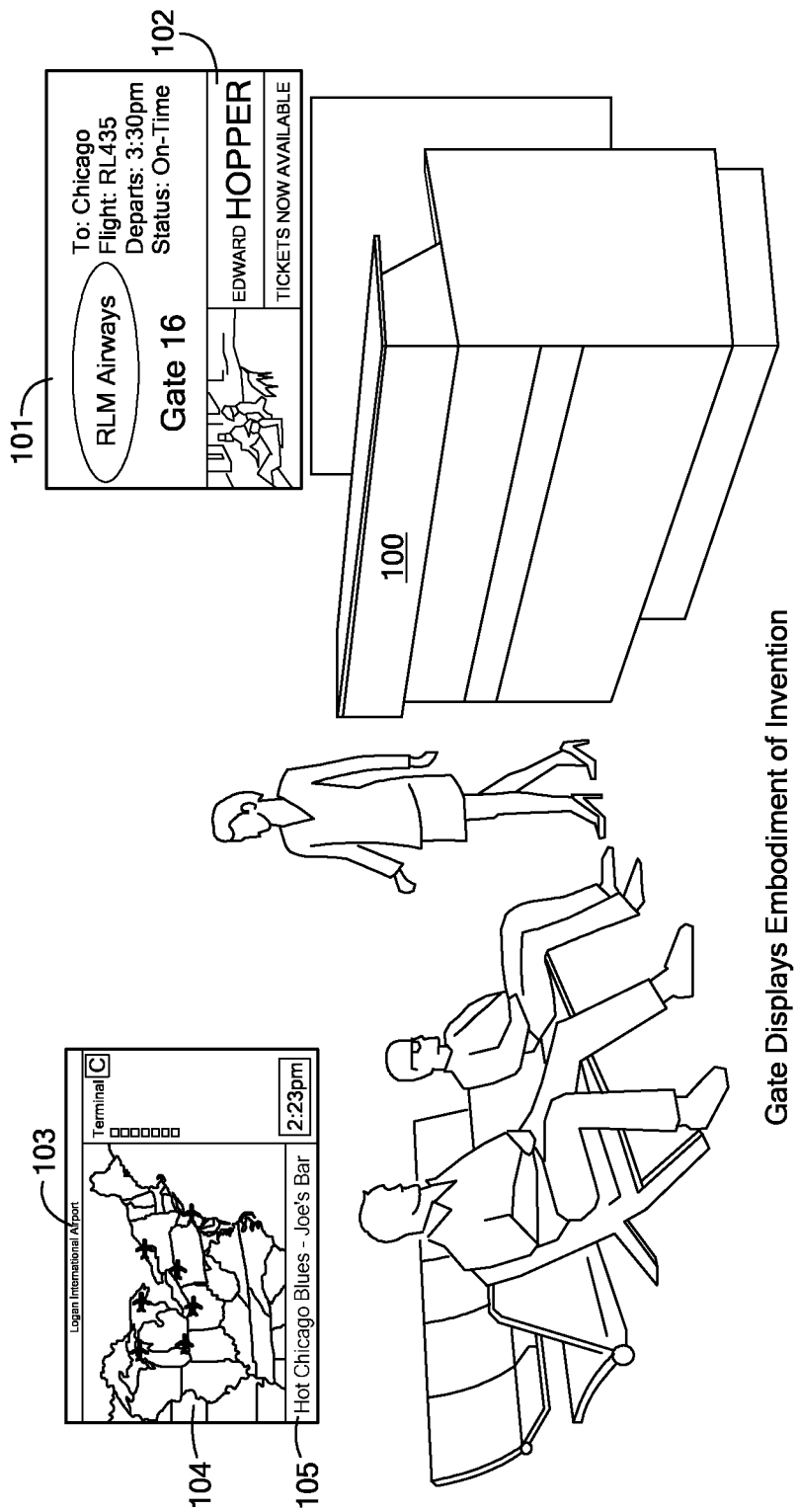
FIG. 1 is a representation of an airport departure lounge in Boston on a Friday at 2:23 pm featuring several electronic signs in accordance with an embodiment of the present invention.

FIG. 1 is a representation of an airport departure lounge in Boston on a Friday at 2:23 pm featuring several electronic signs. The large electronic sign 101 behind the depicted gate counter 100 indicates that the next flight leaving the gate will be departing in route to Chicago at 3:30 pm. The banner advertisement 102 running along the bottom of the sign is an ad for the special exhibit currently on display at the Art Institute of Chicago. Adjacent to the gate is another electronic sign 103 featuring a real-time display 104 representative of the air traffic in the area including the flights arriving and departing from Boston. Periodically the display 104 is replaced by an advertisement for a popular Chicago Night Spot, which may also be displayed on the banner advertisement 105, for example, on the bottom of the display. Since the individuals in the gate area are all flying to Chicago and arriving in the early evening, they provide good targets for both the night spot and museum. Air travelers are on average much more likely than average to eat out and visit cultural institutions, therefore the advertisers get a better return by targeting the advertisements.

The large electronic signs depicted in FIG. 1 may display images or content provided by FlightView®, Inc. of Allston, Mass., such as flight delays, flight arrival and departure data, flight tracking information, weather data relevant to passengers arriving or departing flights or other pertinent travel information. The signs may be headless computers or computer systems without a keyboard that run a web browser through an internet or intranet connection. The signs could alternatively be display screens dedicated to displaying advertisements via transmissions received from a central computer to which the screen is remotely connected. Furthermore, the signs may be linked to information resources such as FlightView® data feeds or FlightView® reports through a direct or remote connection to an electronic communications network such as the internet. Accordingly, information is provided to each display based on the display location within an airport, which location may be indicated by an IP address associated with the display or another unique identifier. Based on the display location within the facility a central computer determines and selects advertisements that are pertinent to flights leaving from that display location. The computer communicates with an ad server or advertisement database that communicates with multiple displays via an electronic network such as a local area network. The computer instructs the ad server to send specific advertisements to specific displays through the network as conditions associated with each display change. Flight information for flights departing out of a gate in the proximity of the display, such as the flights destination, flight arrival time at the destination, or other relevant data, is used in conjunction with event information related to the destination of the flight, such as events occurring at or near the flight destination when determining which advertisements are appropriate. More specifically, other relevant data may include information about the passengers' plans and demographics, which could be related to information such as school vacation schedules, specific sporting events, or tour group information supplied by travel agents. Alternatively, information about the passengers on a flight may simply be based on inferences drawn using clues such as upcoming events occurring at the flight destination as further demonstrated in the discussion of FIG. 2.

Figure 2:
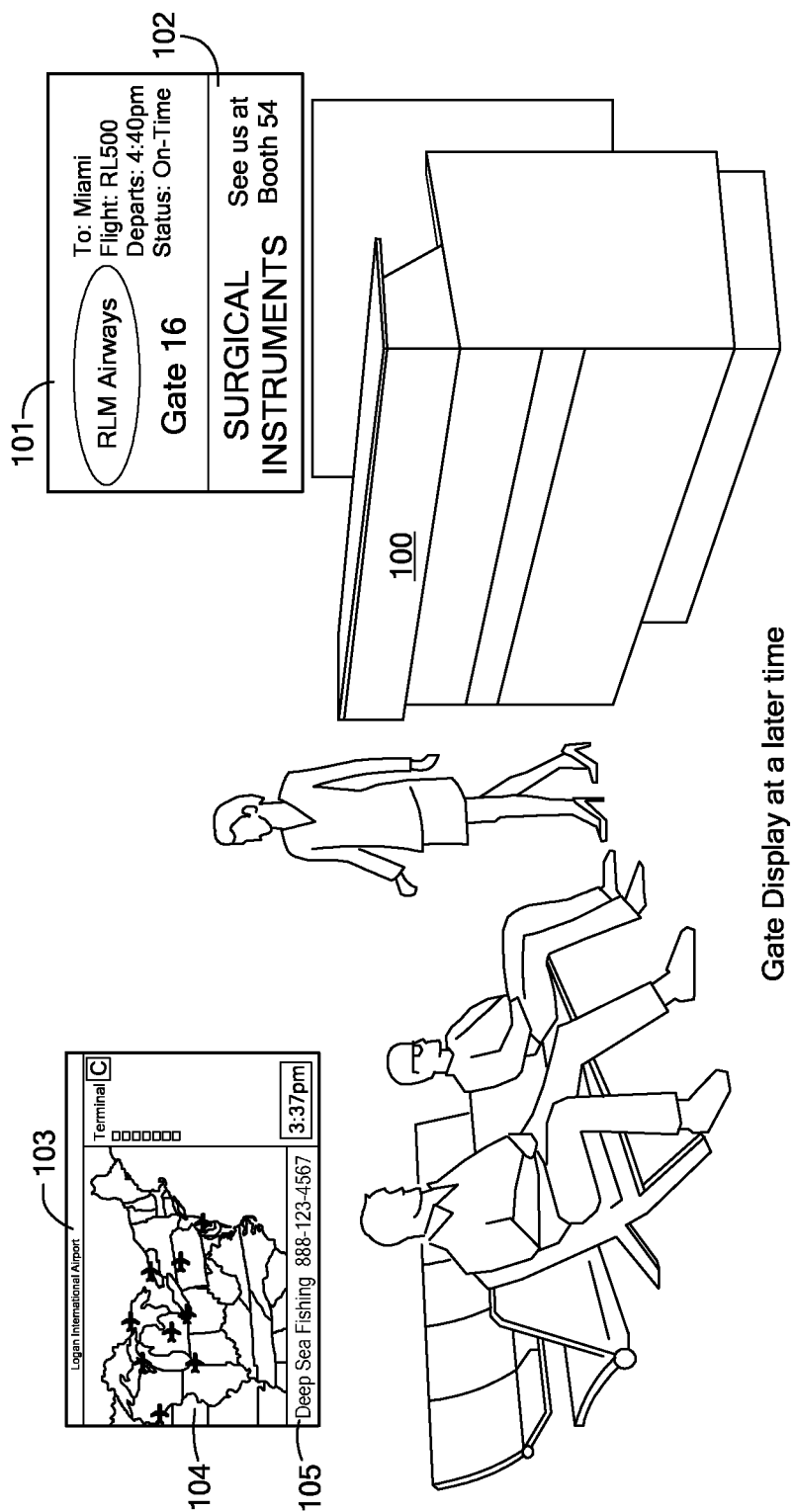
FIG. 2 is a representation of the same departure lounge 2 hours later.

FIG. 2 is a representation of the same departure lounge 2 hours later. The flight to Chicago has left, as determined by an update provided by a real-time data source such as a Flight-View® database, and passengers headed to Miami are now in the gate area. The banner 102 below the gate information is now advertising surgical instruments on the sign. While the sign 103 at the right now touts Deep Sea Fishing on the advertisement banner 105. The ads are appropriate because Miami is hosting a conference of the American Society of Surgeons and many doctors are likely to be on the flight. Their families and other tourists might be interested in booking a fishing boat charter.

The database of flight information used to select advertisements is dynamic in that it is updated based on actual flight data as opposed to just an itinerary or schedule and can account for deviations from flight schedules. Accordingly, the display advertising Chicago related events might continue showing those advertisements even after the scheduled time for the Chicago flight departure, if for example, the flight headed to Chicago is delayed and does not leave when scheduled, due to a snowstorm or other delay-causing occurrence. If such a delay occurs the display time of the Chicago ads may be extended and new Chicago ads may be introduced based on the delay information. This demonstrates the precision and adaptability that such an advertisement mechanism has by using real-time dynamic travel information. Through such dynamics, an advertiser is more likely to get a greater return on his or her investment since the viewing audience is more likely to see advertisements relevant to their travel plans. Through this adaptability, relevant advertisements continue showing to the proper audience and the display of irrelevant advertisements to disinterested audiences is less likely to occur.

Figure 3:
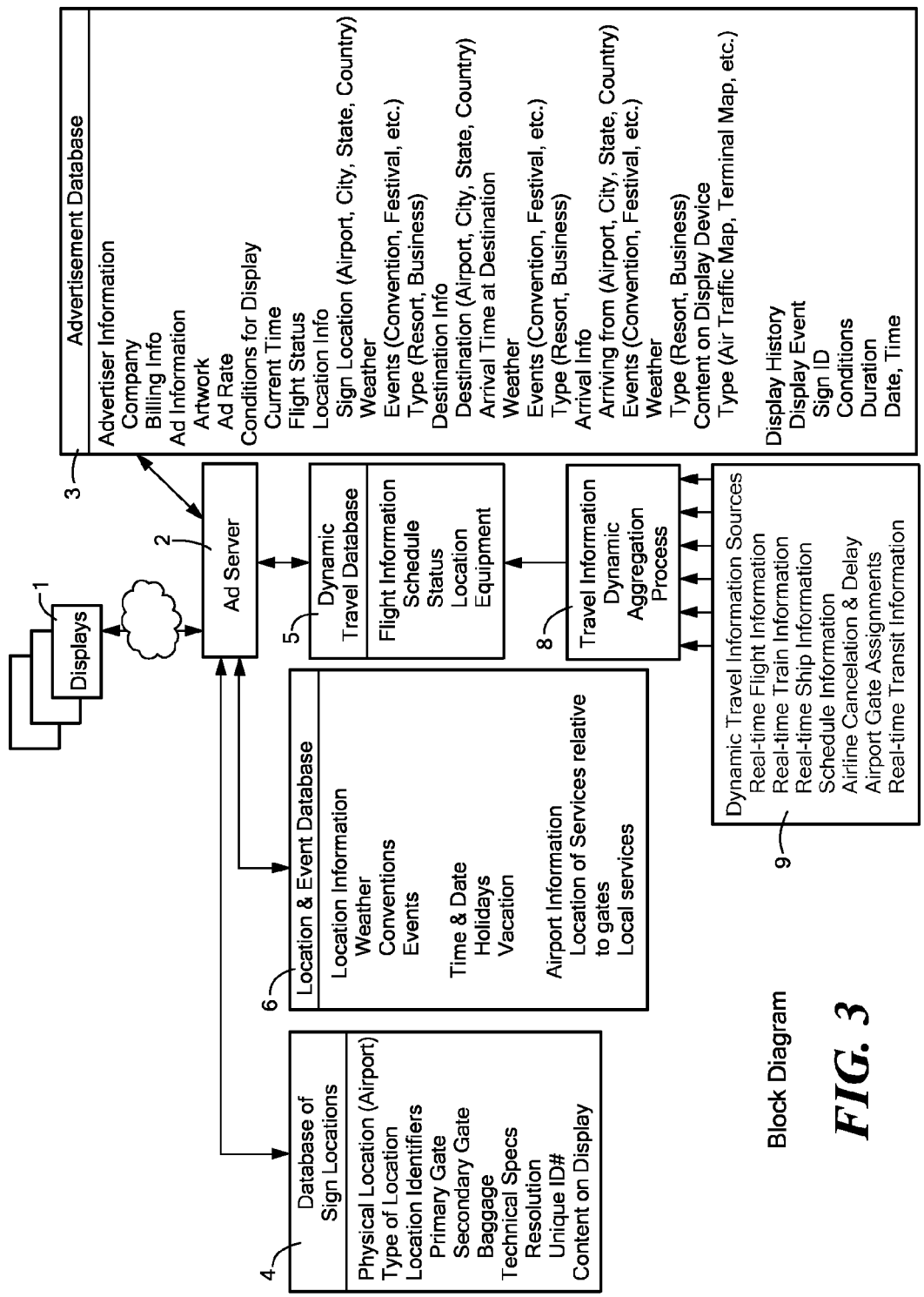
FIG. 3 is a diagram of a targeted advertising system in accordance with an embodiment of the present invention.

FIG. 3 is a diagram of a targeted advertising system in accordance with an embodiment of the present invention. The system may include: a plurality of electronic signs 1 located in transportation facilities, each sign having a unique identifier allowing it to be addressed over the internet or other electronic network; a content server 2 responsible for delivering to each digital sign the appropriate content; a database of advertisements 3, each advertisement accompanied by meta data that indicates the conditions under which the advertisement is to be placed, the price to be paid by the advertiser, the size and shape of the advertisement, and other relevant information about the advertisement; a database 4 containing the attributes of each of the electronic signs and containing information such as location, size, IP address, and content of the sign (for example a gate display, an air traffic map, a terminal map, etc.); a database of dynamic transportation information 5 including the departure and arrival times, gates or other departure location information, current location of the travel vehicle and projected status; a database of events and conditions 6 which are associated with locations including the departure point and destinations of the transportation systems The unique identifier associated with each sign in the plurality of electronic signs may include an IP address, an electronic tag, or other identification information available.

The database of advertisements 3 may be continuously updated as advertisers provide new or updated content. The database may be accessible by an advertiser so that the advertiser may upload new content or update previously stored content; a Travel Information Dynamic Aggregation Process 8 which takes data from a location remote from the targeted advertising system. This process aggregates information from a variety of sources and of a variety of types for a number of transportation facilities (including airports, train stations and shipping terminals): for example, real-time flight information, real-time train information, real-time ship information, schedule information, airline cancellation and delay information, airport gate assignments, and real-time transit information.

Conditions under which an advertisement is to be placed may include alone or in combination the flight destination or departure location, the variety of real-time of departure or arrival, the demographics of flight passengers, date or season information, and other feeds 9 to build a data-set which represents the current or forecasted weather conditions at either the departure or arrival location, or any other available information an advertiser might desire to use or have linked to the initiation of the display status of a particular advertisement.

The database 4 containing the attributes of each electronic sign may be indexed by the unique identifier and containing information such as location, size, IP address.

Figure 4:
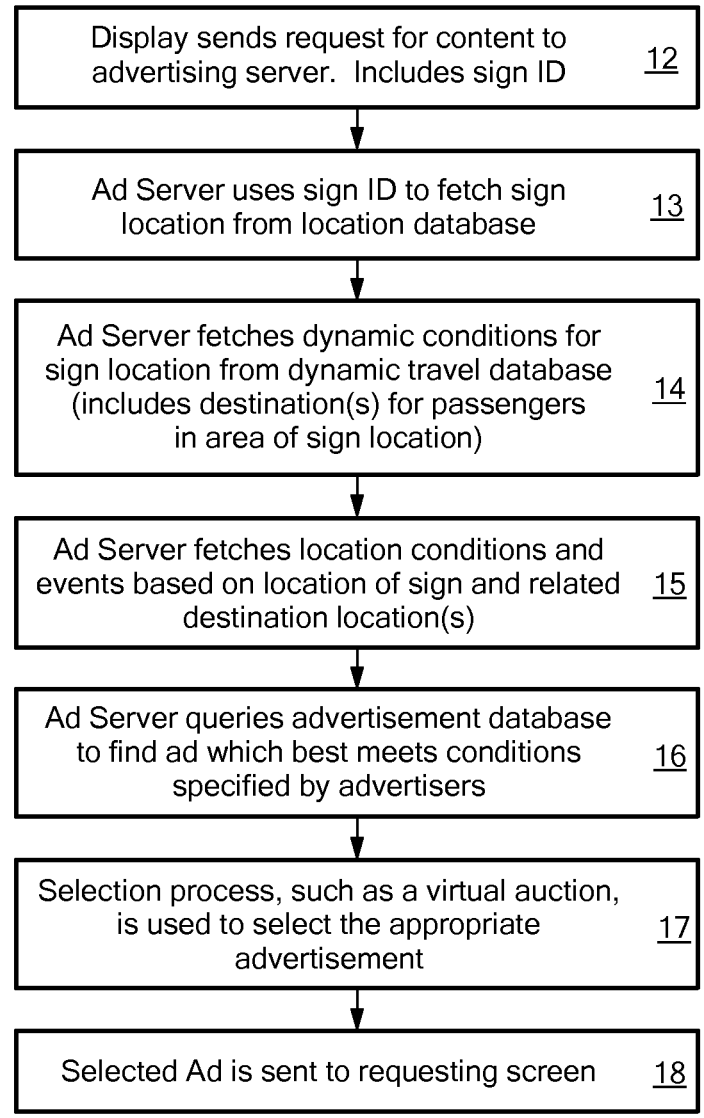
FIG. 4 is a top level flow chart of the Ad server program in accordance with an embodiment of the present invention.

The database of dynamic transportation information 5 may be provided or linked to the arrival and departure display information currently provided in airports or may be linked to other real time travel data information systems FIG. 4 is a top level flow chart of the Ad server program in accordance with an embodiment of the present invention. The program can be a multi-threaded implementation configured to send and receive messages from the remote signs via an XML or other appropriate communication protocol. The process is started at step 12 with a request for content from a specific sign identified by unique sign ID. In the next step 13 the unique ID is used to fetch information about the sign location and characteristics from the sign location database. The location information may include information about gates, or terminals which are physically close to the sign. In step 14 these locations are used to query the dynamic travel database to determine the time and destination for the next departure leaving from the specified location(s). In step 15 the sign location and destination location(s) are used to query the conditions and events related to the current and destination locations. The complete set of conditions of the sign and related destination are used in step 16 to query the advertisement database for advertisements that meet the current conditions. In step 17, the most appropriate advertisement is selected based on criteria such as maximizing the advertisement revenue or a virtual auction. The ad server returns the selected content to the sign in step 18.

Figure 5:
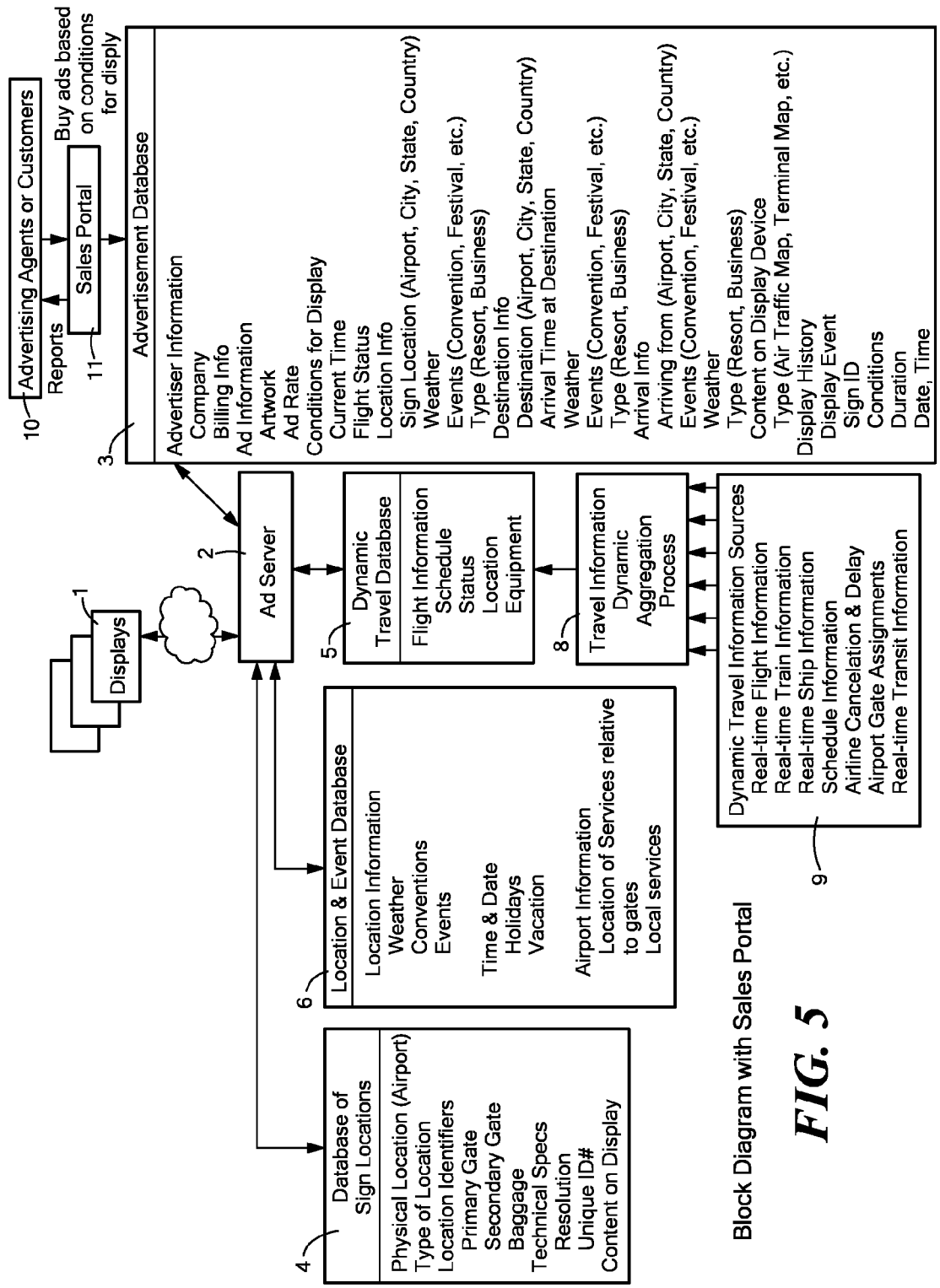
FIG. 5 is an expanded implementation of the invention shown in FIG. 3.

FIG. 5 is an expanded implementation of the invention shown in FIG. 3 with the addition of Sales Portal 11, which is used by advertising agents or advertising customers 10 to (a) purchase advertisements based on conditions specified by the advertisers using the sales portal (b) upload content for the specific advertisements including, but not limited to drawings, images and animation files; and (c) to configure and receive reports including fields such as the time, conditions and locations under which the advertisement was displayed along with the cost of the advertisement.

FIG. 6 is an example of a sales portal implementation of the present invention. In the example an individual (Bill Smith) from a specific advertising agency (Jones & Jones) has logged in to review the campaigns for his customer (Hitz Surgical). The portal allows users to track several different campaigns. In this case the user is reviewing the campaign indicated on the selected tab entitled ACS: Spring 08. The user has entered the name of the campaign, duration, budget and some notes. The next section is for input of the advertising content. In the example, the user has submitted 4 different advertisements in the jpeg format for use under different conditions. In this embodiment of the invention, each advertisement can have one or more conditions under which it might be shown. The conditions include the type of display and the price the advertiser is willing to pay for an advertisement. In the example, the banner ads are to be displayed in departure gate areas for flights heading to Las Vegas on February 23 and 24 the first two days of the ACS surgical convention and the advertiser is willing to pay up to $117 per 1000 displays of the advertisement. An additional section of the portal allows the users to configure custom reports about the display and cost of advertisements.

Figure 7:
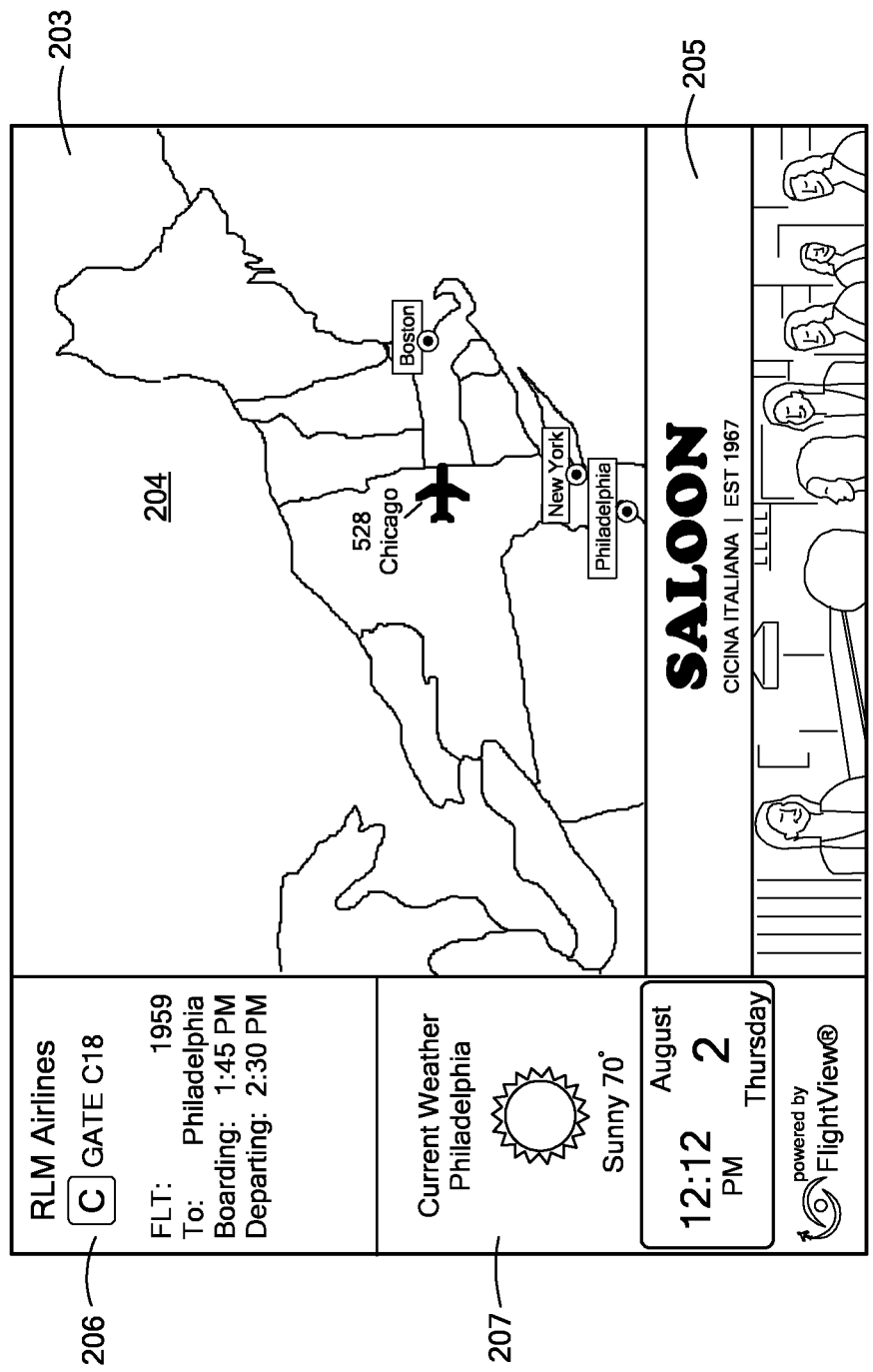
FIG. 7 shows an example embodiment of the invention in which several pieces of dynamic travel information are used along with an advertisement to provide information to the traveler and draw attention of the traveler to the sign.

FIG. 7 shows an example embodiment of the invention in which several pieces of dynamic travel information are used along with an advertisement to provide information to the traveler and draw the attention of the traveler to the sign. In the example, the sign 203 is adjacent to Gate 18 at Boston Logan Airport with a flight scheduled to leave for Philadelphia at 2:30 P.M. The large area 204 on the right is a map of the area surrounding Boston with an icon representing the incoming flight. The position of the incoming flight, in this example flight 528 from Chicago, is updated based on real-time position data from the FAA or other sources. The schedule and gate information 206 on the left is obtained from the airline and weather in the destination city, Philadelphia, is displayed in region 207, below the gate information in this example. The banner advertisement 205 on the bottom of the screen is for a restaurant and bar in Philadelphia.

FIG. 8 shows an embodiment of a sales report that could be generated using the sales portal in accordance with an embodiment of the present invention. The report summarizes the number of times each piece of content was displayed and the cost for the displays. An additional feature of the report would allow the user to drill down to see details of when and where each display occurred.

Embodiments of the disclosed system and methods may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WiFi, microwave, infrared or other transmission techniques). The series of computer instructions may embody all or part of the functionality previously described herein with respect to the system.

Those skilled in the art will recognize that such computer instructions may be written in a number of computer programming languages for use with many computer architectures or operating systems. For example, some embodiments may be implemented in a procedural programming language (e.g., "C"), or in an object oriented programming language (e.g., "C++" or "Java"). Other embodiments of the invention may be implemented as preprogrammed hardware elements (e.g., application specific integrated circuits, field programmable gate arrays, and/or digital signal processors), or other related components. In addition, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink-wrapped software), preloaded with a computer system (e.g., on system ROM or fixed disk), or distributed from a server or electronic bulletin board over the network (e.g., via the Internet or World Wide Web). Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of targeting an advertisement in a digital computer system to users of scheduled transportation operating at a transportation facility, the facility having a set of programmable signs, each of the signs having a distinct location at the facility, the method comprising:
    compiling an integrated database of departure and arrival information for the scheduled transportation;
    with respect to the location of a selected programmable sign of the set, in a computer process determining a dynamic profile of users proximate to the location for a relevant time window by using the integrated database and information related to events where people gather scheduled to take place near a point of departure or destination, said point being remote from and accessible by scheduled transportation from the transportation facility, wherein the dynamic profile is characterized by inferences related to the departure and arrival information and any events taking place at a time such that the probability is increased that users proximate to the location for the relevant time window are there at least in part because of the events;
    selecting from an advertisement database an advertisement having a set of selection criteria that are compatible with the dynamic profile for the relevant time window; and
    causing display of the advertisement on the selected programmable sign during at least a portion of the relevant time window.

2. A method according to claim 1, further comprising causing display of information of consumer interest based on the dynamic profile, during the relevant time window, to draw attention to the programmable sign.

3. A method according to claim 2, further comprising causing display of the information of consumer interest simultaneously with the advertisement.

4. A method according to claim 2, wherein causing display of the advertisement and causing display of the information are coordinated so as to effectuate display in alternation of the advertisement and the information.

5. A method according to claim 1, wherein the selection criteria include a set of conditions reflecting a specification supplied by an advertiser.

6. A method according to claim 1, wherein the dynamic profile of users proximate to the location is created using real-time dynamic flight data.

7. A method according to claim 6, wherein the flight data is flight delay status.

8. A method according to claim 1, wherein compiling further comprises compiling an integrated database of real-time departure and arrival information for the scheduled transportation as well as scheduled departure and arrival information for the scheduled transportation.

9. A method according to claim 8, further comprising:
    storing statistics relative to display of the advertisement including data from the dynamic profile applicable to the relevant time window.

10. A method according to claim 9, wherein the advertisement is associated with an advertiser, the method further comprising:
   providing a report to the advertiser based on the stored statistics.

11. A method of handling a request from an advertiser for a targeted advertisement to be displayed on a set of programmable signs, at a set of transportation facilities, to users of scheduled transportation in a digital computer system, the method comprising:
   receiving, in a first computer process, via an advertising sales portal, the portal accessible to the advertiser over a network, a specification by the advertiser of (1) an advertisement to be displayed; and (2) a set of conditions for display of the advertisement, the conditions relating at least in part to a remote location, which is a point of departure or a destination with respect to scheduled transportation, accessible from one of the set of transportation facilities, and wherein the set of conditions further includes information relating to events, associated with the remote location, at which people gather; and
   causing, in a second computer process, display of the advertisement, on at least one member of the set of programmable signs at the one of the set of transportation facilities, dynamically, in accordance with the specification, taking into account inferences related to real-time departure and arrival information for the scheduled transportation as well as scheduled departure and arrival information for the scheduled transportation and inferences related to an increased probability that people near the at least one member of the set of programmable signs are there at least in part because of one of the events.

12. A method according to claim 11, wherein the specification by the advertiser further includes a selection of members of the set of programmable signs on which the advertisement is to be displayed.

13. A method according to claim 11, further comprising:
   in a third computer process developing a dynamic profile of users proximate to a location for each member of the set of programmable signs for a relevant time window based in part on real-time departure and arrival information for the scheduled transportation as well as scheduled departure and arrival information for the scheduled transportation; and
   using the dynamic profile in determining when to cause display of the advertisement.

14. A method according to claim 13, further comprising:
   storing statistics relative to display of the advertisement including data derived from the dynamic profile.

15. A method according to claim 14, further comprising:
   providing a report to the advertiser using the stored statistics.

16. A method according to claim 11, further comprising:
   determining a price for displaying the advertisement according to an auction mechanism.

17. A method according to claim 11, wherein the one of the events comprises a convention.

18. A method according to claim 11, wherein the one of the events comprises a sporting event.

19. A method according to claim 11, wherein the one of the events comprises a conference.

20. A method according to claim 11, wherein the one of the events comprises a festival.

21. A computer program product for targeting an advertisement to users of scheduled transportation at a transportation facility, the facility having a set of programmable signs, each of the signs having a distinct location at the facility, the computer program product comprising a non-transitory computer usable medium having computer readable program code thereon, the computer readable program code comprising:
   program code for compiling an integrated database of departure and arrival information for the scheduled transportation;
   program code for determining a dynamic profile of users proximate to the location for a relevant time window by using the integrated database and information related to events where people gather scheduled to take place near a point of departure or destination, said point being remote from and accessible by scheduled transportation from the transportation facility, wherein the dynamic profile is characterized by inferences related to the departure and arrival information and any events taking place at a time such that the probability is increased that users proximate to the location for the relevant time window are there at least in part because of the events;
   program code for selecting from an advertisement database an advertisement having a set of selection criteria that are compatible with the dynamic profile for the relevant time window; and
   program code for causing display of the advertisement on the selected programmable sign during at least a portion of the relevant time window.

22. A computer program product in accordance with claim 21, the computer program product including computer program code for causing display of information of consumer interest based on the dynamic profile, during the relevant time window, to draw attention to the programmable sign.

23. A computer program product in accordance with claim 22, the computer program product including computer program code for causing display of the information of consumer interest simultaneously with the advertisement.

* * * * *